United States Patent

Knapp et al.

[11] 4,002,451
[45] Jan. 11, 1977

[54] GLASS GOB HANDLING

[75] Inventors: Warren R. Knapp, Addison; Richard L. West, Sr., Corning, both of N.Y.

[73] Assignee: Corning Glass Works, Corning, N.Y.

[22] Filed: Aug. 22, 1975

[21] Appl. No.: 606,748

[52] U.S. Cl. .................... 65/127; 65/207; 65/303; 65/304; 65/330

[51] Int. Cl.² .......................... C03B 5/34

[58] Field of Search ............ 65/127, 207, 226, 303, 65/304, 328, 330

[56] References Cited
UNITED STATES PATENTS

| | | | |
|---|---|---|---|
| 1,657,640 | 1/1928 | Peiler | 65/127 X |
| 1,712,327 | 5/1929 | Brooke | 65/304 X |

Primary Examiner—Arthur D. Kellogg
Attorney, Agent, or Firm—Charles W. Gregg; Burton R. Turner; Clarence R. Patty, Jr.

[57] ABSTRACT

Apparatus for and a method of preforming into an elongate mold charge a gob of molten glass issuing from the outlet orifice of a forehearth and delivering such elongate charge to the forming cavity of a forming mold with the virgin or untouched surface of the charge facing downwardly in such cavity thereby providing to the mold cavity a mold charge having one or a lower surface of high optical quality. A mothering or serving cup receives said gob from said outlet orifice and is horizontally moved to spread or preform the gob into the elongate mold charge with the upper surface thereof being untouched, and the cup is then inverted to deliver the charge to a mold cavity with said upper surface of the gob facing downwardly.

8 Claims, 8 Drawing Figures

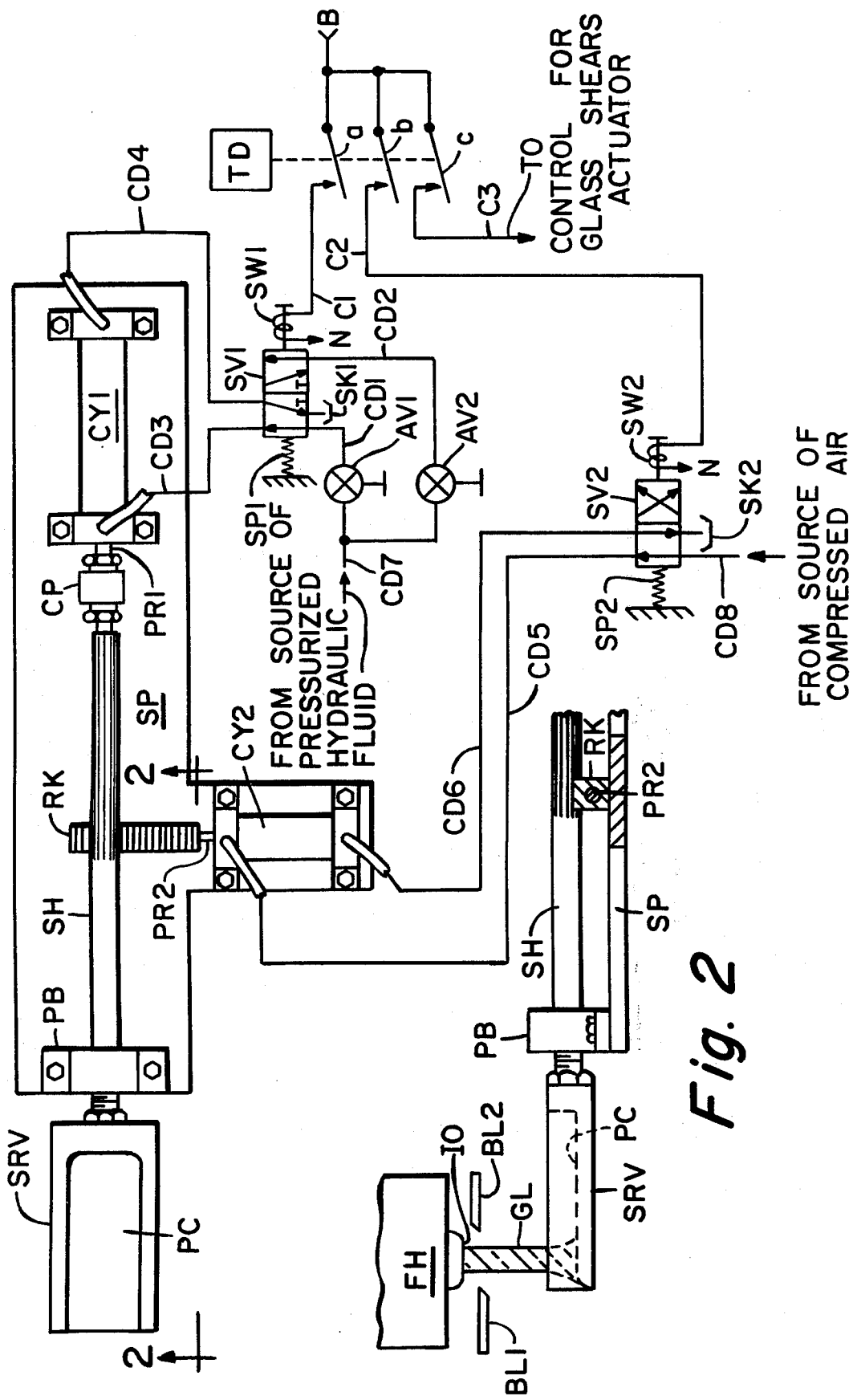

GLASS GOB HANDLING

BACKGROUND OF THE INVENTION

In the manufacture of lens from molten glass it is desirable that at least one surface of the lens have a high optical quality without chill wrinkles in such surface to eliminate grinding and polishing of such one surface, and it is necessary that the shear marks made by shearing of the glass gob from which the lens is finally formed be out of the quality area of the glass of the finally formed lens. In the forming of relatively elongate types of lens or lens of other odd shapes it has, prior to the present invention, been necessary to form the lens blanks or preformed mold charges by hand to eliminate the aforesaid chill wrinkles in the glass of the lens blanks or glass preforms. Such manual preforming of mold charges is obviously time consuming and, therefore, uneconomical. It is, accordingly, an object of the present invention to provide an apparatus for preforming from gobs of molten glass elongate or similar glass mold without chill or shear marks in the quality area of the mold charges.

It is another object of the present invention to provide a method of preforming an elongate glass mold charge and delivering such charge to the forming cavity of a forming mold with a virgin or untouched side of the glass facing downwardly in such mold.

Other objects and characteristics features of the invention will become apparent as the description proceeds.

SUMMARY OF THE INVENTION

The invention is believed to be adequately summarized in the foregoing abstract of the disclosure and, therefore, to avoid repetition or redundancy to the extent possible, no further summary of the invention will be given nor is any considered necessary.

BRIEF DESCRIPTION OF THE DRAWINGS

In the drawings:

FIG. 1 is a top plan view of one form of apparatus which may be used in practicing the invention disclosed, such view also including a schematic diagram of a control means or system for the other apparatus of FIG. 1;

FIG. 2 is an elevational view of a part of the apparatus of FIG. 1, such view being taken along line 2—2 of FIG. 1 and illustrating an initial positioning of the apparatus relative to the outlet orifice of a forehearth and the blades of a pair of molten glass shears used in conjunction therewith.

Similar reference characters refer to similar parts in each of the Figs. of the drawings.

PREFERRED EMBODIMENT OF THE INVENTION

Figure 3:
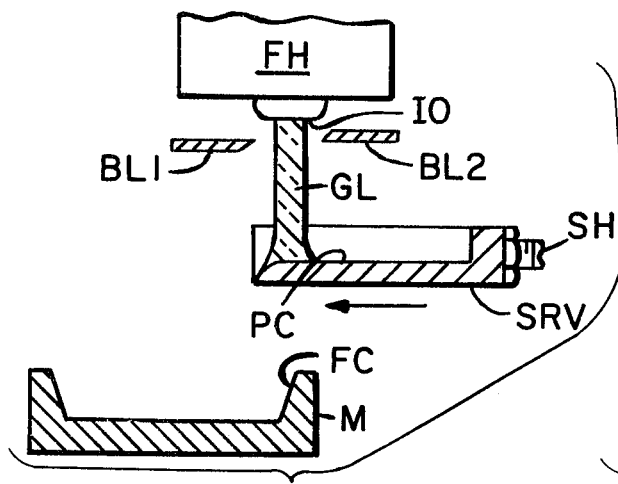
FIGS. 3 through 8 schematically illustrates sequential stages in the operation of the apparatus of the invention in preforming a gob of molten glass into a preformed mold charge and supplying it to the mold cavity of a forming mold.

Referring to the drawings in detail, there is shown in FIGS. 1 and 2 a horizontally extending support plate SP which is disposed and supported in any convenient manner below and adjacent to the outlet or molten glass issuance orifice IO of a forehearth FH (FIG. 2). A first motor means or pressurized fluid cylinder CY1 is affixed to the upper surface of support plate SP adjacent the right hand end thereof (viewing FIG. 1) such cylinder preferably, but not necessarily, comprising a pressurized hydraulic fluid actuated cylinder and associated piston and piston rod (PR1). The otherwise free end of piston rod PR1 of said cylinder is connected to one end of a coupling CP whose second end is connected to a first end of a spline shaft SH. Coupling CP is of a type which provides for push and pull strokes of shaft SH by piston rod PR1 while permitting rotation of shaft SH without corresponding rotation of piston rod PR1. Couplings such as CP are well known in the art and the coupling may, for example, be a self-aligning cylinder rod coupler, Casco Model RA31C which is obtainable from Compressed Air Service Company whose address is 1900 W. Dorothy Lane, Dayton, Ohio 45439.

Shaft SH is termed a spline shaft although a substantial part of the length of such shaft along the left hand portion thereof is smooth and slidably extends through a cooperative sleeve or bushing (not shown) held in a suitable rotative bearing (also not shown) supported in a pillow block PB attached to the upper surface of support plate SP adjacent the left hand end thereof when viewing FIGS. 1 and 2. Such arrangement will be readily apparent to those skilled in the art. It is pointed out that shaft SH could have splines extending completely along the length thereof if the bushing or sleeve in the bearing in pillow block PB also is internally provided with splines cooperative with or fitting the splines of such a shaft as will also be readily apparent to those skilled in the art.

The second or left hand end of shaft SH (viewing FIGS. 1 and 2) is connected to one end of a so-called mothering or serving cup SRV embodying a relatively elongate glass gob preforming cavity PC and to be hereinafter further discussed. A second motor means or pressurized fluid cylinder CY2 is affixed to the upper surface of a lateral extension of support plate SP and an extension of the piston rod PR2 of such cylinder comprises a rack RK extending toward and under the splines of shaft SH, such rack having on its upper surface a series or sequence of teeth which are complemental to or cooperatively mesh with said splines in the manner of a rack and pinion gear arrangement. By such arrangement it will be apparent that longitudinal movement of rack RK by piston rod PR2, as hereinafter discussed, will impart rotative movement or rotation to shaft SH and, thereby, to serving cup SRV to at times invert such cup for purposes also hereinafter discussed. Cylinder CY2 preferably, but not necessarily, comprises a compressed air actuated cylinder and associated piston and piston rod (PR2).

Referring to the previously mentioned control means or system schematically shown in FIG. 1, there is illustrated, in block diagram form, a timing drum TD which actuates electrical circuit controlling contacts including contacts a, b and c to open and closed conditions in a preselected sequence. Such timing drum, for example, may be and is preferably the same timing drum that is used for controlling the issuance of gobs of molten glass from the outlet or issuance orifice IO of forehearth FH illustrated in FIG. 2, such timing drums being well known in the art. It is also pointed out that electrical circuit controlling contact c of timing drum TD controls the actuator for a pair of glass shears comprising blades BL1 and BL2 shown in FIG. 2. There is also schematically shown in FIG. 1, a first electrical solenoid actuated, spring return, fluid flow control valve SV1 including solenoid winding SW1 and return spring SP1, and a second electrical solenoid actuated, spring return, fluid flow control valve SV2 including solenoid winding SW2 and return spring SP2. Solenoid actuated and spring return valves such SV1 and SV2 are well known in the art.

Also schematically shown in FIG. 1 are manually adjustable fluid flow control valves AV1 and AV2, fluid conduits CD1 through CD8, electrical conductors C1, C2 and C3, and fluid sinks SK1 and SK2 associated with valves SV1 and SV2, respectively. A suitable source of direct electrical current, such as a battery of proper voltage and capacity, is provided for energization of the solenoid windings SW1 and SW2 of valves SV1 and SV2, respectively, but for purposes for simplification of the drawings, such source is not shown therein but its positive and negative terminals are designated B and N, respectively. Similarly, suitable sources of pressurized hydraulic fluid and compressed air are also provided but such sources are also not shown in the drawings for purposes of simplification thereof.

In the normal or unactuated condition of solenoid valve SV1 the outlet side of adjustable fluid flow control valve AV1 is connected through fluid conduit CD1 to the left hand side of valve SV1 through such valve to fluid conduit CD1, and thence to the left hand end of cylinder CY1 (viewing FIG. 1). At the same time the right hand end of cylinder CY1 is connected through conduit CD4 and the left hand side of valve SV1 to fluid sink SK1. Pressurized hydraulic fluid at such times flows from the above mentioned source thereof through fluid conduit CD7 to the inlet side of adjustable valve AV1 and out of the outlet side of such valve and over the fluid flow path just described to the left hand end of cylinder CY1. Piston Rod PR1 of cylinder CY1, thereby, maintained retracted within cylinder CY1 at such time. In the actuated condition of solenoid valve SV1, that is, when solenoid winding SW1 of valve SV1 is energized by the closing of contact *a* of timing drum TD as hereinafter discussed, the outlet side of adjustable fluid flow control valve AV2 is connected through fluid conduit CD2 to the right hand side of valve SV1 and through such valve to fluid conduit CD4, and thence to the right hand end of cylinder CY1. At the same time the left hand end of cylinder CY1 is connected through conduit CD3 and the right hand side of valve SV1 to fluid sink SK1. Pressurized hydraulic fluid at this time flows from the aforesaid source thereof through conduit CD7 to the inlet side of adjustable valve AV2 and out of the outlet side of such valve and over the fluid flow path just described to the right hand side of cylinder CY1. Piston rod PR1 is, thereby, actuated to move or extend out of cylinder CY1 at such time and actuate shaft SH as further discussed below. When solenoid winding SW1 of valve SV1 is thereafter deenergized, spring SP1 of such valve reactuates the valve to its condition shown in FIG. 1 and piston rod PR1 is again retracted within its cylinder CY1.

In the unactuated condition of solenoid valve SV2, compressed air flows from the previously mentioned source thereof through conduit CD8 and the left hand side of valve SV2 to fluid conduit CD5 and thence to the upper end of cylinder CY2 (viewing FIG. 1) while the lower end of such cylinder is connected through conduit CD6 and the left hand side of valve SV2 to atmosphere or fluid sink SK2, if such a sink is employed. Piston rod PR2 of cylinder CY2 is, thereby, maintained retracted within cylinder CY2 at such time.

In the actuated condition of solenoid valve SV2, that is, when solenoid winding SW2 of valve SV2 is energized by the closing of contact *b* of timing drum TD as hereinafter discussed, compressed air flows from the aforesaid source thereof through conduit CD8 and through the right hand side of valve SV2 to conduit CD6 and thence to the lower end of cylinder CY1 while the upper end of such cylinder is connected through conduit CD5 and the right hand side of valve SV2 to atmosphere or fluid sink SK2, if such a sink is used. Piston rod PR1 is, thereby, moved or extended out of cylinder CY1 at such time to actuate rack RK as further discussed hereinafter. When solenoid winding SW2 of valve SV2 is thereafter deenergized, spring SP2 of such valve reactuates such valve to its condition shown in FIG. 1 and piston rod PR2 is again retracted within its cylinder CY2.

OPERATIONAL EXAMPLE OF THE INVENTION

Initially it should be pointed out that manually adjustable valve AV1 is adjusted to provide a fast or rapid flow of pressurized hydraulic fluid therethrough while manually adjustable valve AV2 is adjusted to provide a relatively slow flow of pressurized hydraulic fluid therethrough. The purposes of such adjustments will be apprent as the description proceeds. It will be assumed for purposes of the operational example of the invention that the sources of pressurized hydraulic fluid and compressed air have been activated and that the apparatus is in the conditions shown in FIGS. 1 and 2.

Assuming now that serving cup SRV is located below the outlet or issuance orifice IO of forehearth FH as illustrated in FIG. 2 and that the glass gobbing or glass issuance control means of orifice IO has been actuated to cause a glass gob or stream of molten glass such as GL to issue from orifice IO as also shown in FIG. 2, contact *a* of timing drum TD is adjusted so that, just prior to or when the lower end of the glass gob or stream contacts the bottom of preforming cavity PC in serving cup SRV as illustrated in FIGS. 2 and 3, such contact *a* closes to close an electrical energizing circuit for solenoid winding SW1 of valve SV1, such circuit extending from terminal B of the battery over said contact *a* and over conductor C1 and through said winding SW1 to terminal N of the battery. Such emergization of winding SW1 causes valve SV1 to shift and thereby relatively slowly supply pressurized hydraulic fluid to the right hand end of cylinder CY1. This causes piston rod PR1 of cylinder CY1 to move or extend relatively slowly out of such cylinder in the left hand direction and slowly shaft SH and, thereby, serving cup SRV in a corresponding direction as indicated by the arrows in FIGS. 3 through 6 of the drawings. This causes the gob or stream of glass GL to be spread along cavity PC of serving cup SRV during the continued relatively slow movement in the left hand direction (viewing FIGS. 2 through 6) of such serving cup. The relatively slow movement of serving cup SRV also permits the glass GL to spread laterally in cavity PC of such cup and thereby fill the width of such cavity as the serving cup is so moved.

Figure 4:
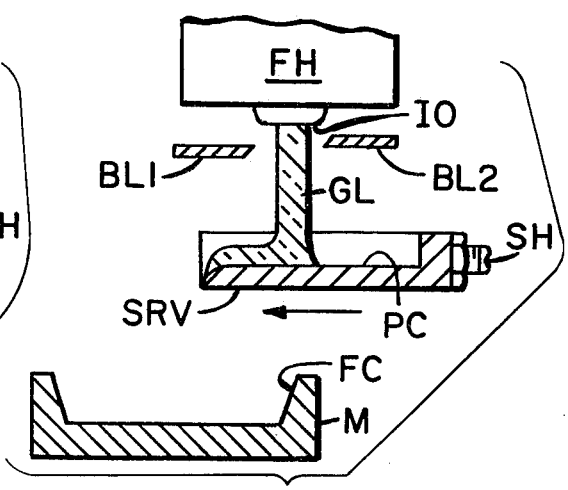
Figure 5:
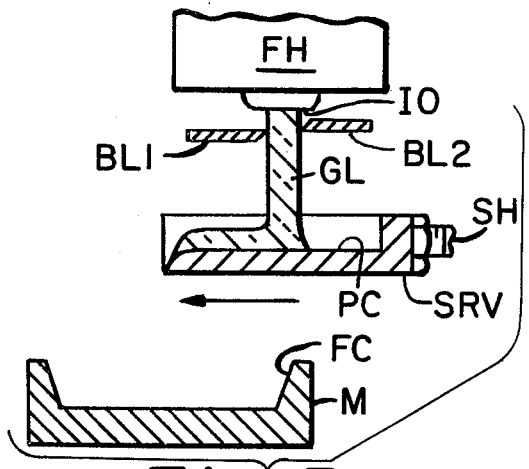
Figure 6:
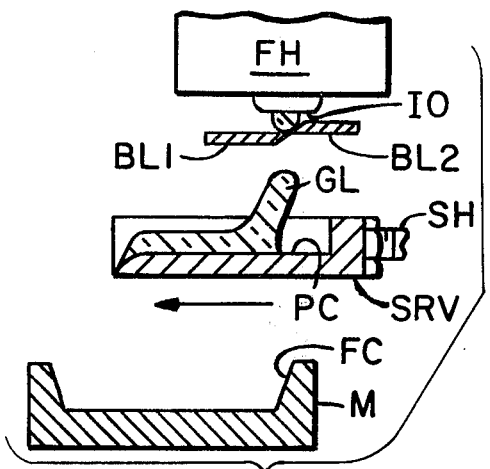
Figure 7:
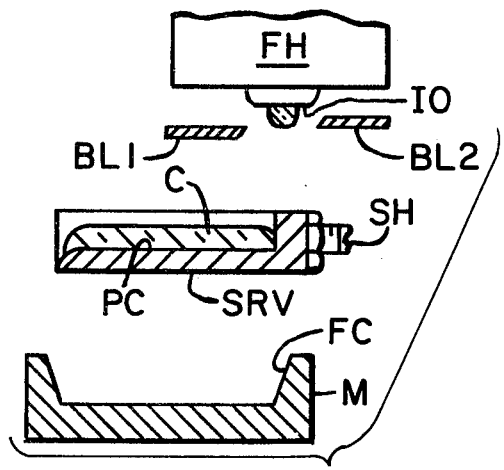

FIG. 4 of the drawings illustrates a stage in the spreading of the glass GL along preforming cavity PC, the center of such cavity having almost reached the midpoint of the continued movement of serving cup SRV. During further movement of serving cup SRV to the midpoint or just beyond such point in its left hand movement, contact *c* of timing drum TD (FIG. 1) is actuated closed to close an electrical circuit to the control for the glass shears actuator to actuate such shears, comprising blades BL1 and BL2, and cause such blades to move towards a gob or glass severing condition thereof as illustrated in the stage of FIG. 5. Said electrical circuit for the control of the glass shears actuator extends from terminal B of the battery over contact $c$ of timing drum TD in its closed condition and to conductor C3 and thence to said actuator as indicated in FIG. 1. The stage of FIG. 6 shows the completion of the severing of glass GL, the lower blade BL1 of the glass shears having struck and supplied a moment of force in the right hand direction to the severed end of the glass charge moving towards cavity PC to, in conjunction with further movement of serving cup SRV in the left hand direction, cause such severed end of the charge to fall to the right, such charge thereby filling cavity PC, as illustrated in the stage of FIG. 7, with the shear marks in said severed end being disposed at the extreme right hand end of the now preformed mold charge and out of the quality area of such charge. The use of the lower blade of a pair of glass shears to strike or bump and supply a moment of turning force to the severed end of a glass charge for positioning of such end in a mold cavity is an old and well known expedient in the glass making art. If found necessary or considered expedient to do so, a pair of molten glass shears such as disclosed in U.S. Pat. No. 3,607,208, issued Sept. 21, 1971 to George A. Kapral and assigned to the same assignee as the present application, can be used to supply the desired movement of force to the severed end of the glass charge. In such event blade BL1 of the present application would comprise a blade such as 10 of said patent.

Figure 8:
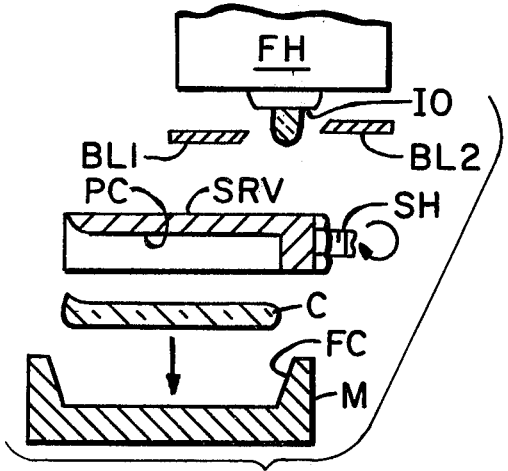

Immediately after the above described glass severing step illustrated in the stage of FIG. 6, contact $e$ of timing drum TD is actuated open to deenergize the control means for the glass shears actuator and cause blades BL1 and BL2 to return to their normal unactuated condition as shown in the stage of FIG. 7 of the drawings. When the severed glass mold charge is fully disposed within cavity PC of serving cup SRV, that is when the preforming of the glass into a preformed mold charge C is completed as illustrated in the stage of FIG. 7 of the drawings, contact $b$ of timing drum TD is actuated closed to close the energizing circuit for solenoid winding SW2 of solenoid valve SV2. Such circuit extends from terminal B of the battery over said contact $b$ of timing drum TD, over conductor C2 and thence through said winding SW2 to terminal N of the battery. Such energization of winding SW2 causes valve SV2 to shift to the left to supply compressed air through such valve to conduit CD6 and thence to the lower end of cylinder CY1 and cause rapid extension or movement of piston rod PR2 out of cylinder CY2 and corresponding movement of rack RK. Such movement of rack RK causes rotation of shaft SH and corresponding rotation of serving cup SRV to invert such cup and deliver, by the force of gravity and as illustrated in the stage of FIG. 8, the elongated preformed mold charge C in cavity PC of the cup to a mold or forming cavity FC of a mold M shown below serving cup SRV throughout the stages of FIGS. 3 through 8 of the drawings, such delivery of the preformed mold charge C to cavity FC being performed with the untouched or virgin surface of such charge facing downwardly in such cavity. Mold M may, for example, be one of a series of molds each of which are sequentially indexed to a position below cup SRV by a turret type glass pressing or forming machine of any of the types well known in the art.

Immediately after the delivery of the preformed mold charge C to the forming cavity FC of a mold such as M as illustrated in FIG. 8, contacts $a$ and $b$ of timing drum TD are actuated open to deenergize the solenoid windings SW1 and SW2 of valves SV1 and SV2, respectively, and permit the springs SP1 and SP2, respectively, of such valves to shift the valves to their normal or initial conditions shown in FIG. 1. Such actuation of valve SV1 causes pressurized hydraulic fluid to flow rapidly to the left hand end of cylinder CY1 to rapidly retract piston rod PR1 into such cylinder and thereby rapidly move shaft SH and serving cup SRV to their initial positions in preparation for receiving in preforming cavity PC of such cup and spreading therein, to form into another elongated preformed mold charge, another or following gob of molten glass issued form orifice IO. Said actuation of valve SV2 causes compressed air to be supplied to the upper end of cylinder CY2 to rapidly retract or move piston rod PR2 into such cylinder and, thereby, move rack RK to rapidly rotate spline shaft SH to, in turn, rotate serving cup SRV to its initial upwardly facing position in preparation for receipt, in preforming cavity PC thereof, of said other or following gob of molten glass.

It is believed expedient to point out that with mold charges such as C preformed by the apparatus for and method of preforming such charges as disclosed herein, shear marks remaining in the sheared end of a succeeding gob issuing from outlet orifice IO and made by the molten glass shears in severing a preceding gob supplied to cavity PC of serving cup SRV, are located in the glass of said succeeding gob at the extreme left hand end thereof, that is, in the glass which is supplied to the left hand end (viewing FIG. 1) of cavity PC of serving cup SRV. Therefore such shear marks are located in the preformed glass mold charges such as C out of the quality area of each of such a charge.

Although there is herein shown and described only one form of apparatus for and method of practicing the invention disclosed, it will be understood that such is not to be considered in any way limiting but that various changes and modifications may be made therein within the purview of the appended claims without departing from the spirit and scope thereof.

What is claimed is:

1. The method of receiving a gob of a relatively viscous molten glass issuing from the outlet orifice of a forehearth and preforming such gob into a relatively elongate mold charge and then delivering such charge to the forming cavity of a forming mold with the virgin surface of the charge facing downwardly in such cavity, such method comprising;
   A. longitudinally and slowly moving a serving cup having an elongate cavity beneath said outlet orifice so that said gob as it issues such orifice is spread along a substantial part of the length of the cavity of the serving cup to form said elongate mold charge;
   B. severing said glass gob with a pair of molten glass shears before the mold charge is spread along the entire length of the cavity of the severing cup, the lower blade of said glass shears during the severing operation also striking the severed end of the glass gob to cause such end to be moved in a direction to fill the remainder of the length of the cavity of the severing cup during continuation of said movement thereof; and rapidly inverting said serving cup over the forming cavity of said forming mold at a speed sufficient to deliver said mold charge to the forming cavity by gravity with the virgin side of such mold facing downwardly in such cavity.

2. The method of handling and preforming into an elongate mold charge a gob of molten glass issuing from the outlet orifice of a forehearth and then delivering such charge to the mold cavity of a forming mold, such method comprising;

A. slowly and longitudinally moving a serving cup having an elongate mold cavity beneath and in relatively close proximity to said outlet orifice to receive in such cavity said gob and spread such gob along a substantial part of the length of the cavity of the serving cup during said longitudinal movement thereof and substantially form said elongate mold charge;

B. severing said gob with a pair of molten glass shears before the mold charge is spread along the entire length of the cavity of the serving cup, the lower blade of said glass shears during such severing step also striking the severed end of the glass gob to cause such end to move in a direction to fill the remainder of the cavity of the serving cup during the last part of said longitudinal movement of such cup; and C. rapidly inverting said serving cup over said mold cavity of said forming mold at a speed sufficient to deliver the preformed elongate mold charge by gravity to such cavity with the virgin side of such charge facing downwardly in the mold cavity of the forming mold.

3. In the forming from a gob of molten glass issued from the outlet orifice of a forehearth an elongate lens having one side of a high optical quality, the method comprising;

A. horizontally and slowly longitudinally moving an elongate serving cup having an elongate cavity in close proximity to said outlet orifice, and thereby receiving and slowly spreading said gob along the length of said cavity;

B. prior to completely filling said cavity, severing said gob with a pair of molten glass shears, the lower blade of such shears also striking the severed end of the gob to move it in a direction opposite to the direction of said movement of said serving cup to complete the filling of said cavity of such cup; and C. rapidly inverting said serving cup over said cavity in a forming mold at a speed sufficient to deliver by gravity the preformed gob to the cavity of the forming mold with the virgin side of the gob facing downwardly in such cavity to thereby provide said one side of a high optical quality for said lens.

4. Apparatus for performing into an elongate mold charge a gob of molten glass issued from the outlet orifice of a forehearth and delivering the preformed mold charge to the forming cavity of a forming mold located below but offset from said orifice, such delivery being performed with the virgin side of the mold charge facing downward in said forming cavity, such apparatus comprising, in combination;

A. a support plate horizontally disposed below and adjacent to said outlet orifice;

B. a shaft rotatably and longitudinally slidably supported adjacent the upper surface of said support plate, C. a longitudinal serving cup embodying an elongate cavity having an initial end disposed beneath said outlet orifice with one end of such cup affixed to a first end of said shaft, D. first motor means coupled with the second end of said shaft for longitudinal movement of such shaft and thereby of said serving cup, E. second motor means connected with said shaft for rotation thereof and thereby inversion of said serving cup, F. a pair of molten glass shears between said outlet orifice and said cavity of said serving cup, and G. control means actuated in synchronism with the issuance of a gob of molten glass from said outlet orifice for:

I. energizing said first motor means in a first mode to slowly longitudinally move said serving cup and thereby said cavity therein beneath said outlet orifice to thereby receive said gob as it issues from said orifice and spread the gob along the length of said cavity to form said preformed mold charge;

II. actuating said shears to shear said gob from the parent stream of molten glass issued from said orifice, the lower blade of such shears striking the severed end of the gob to move such end in the direction opposite to the direction of movement of said serving cup during slight continuation of such movement;

III. energizing said second motor means in a first mode to rapidly rotate said shaft and thereby invert said serving cup to deliver the preformed mold charge to said cavity of said forming mold with the virgin side of such mold charge facing downwardly in such cavity; and IV. energizing each of said first and second motor means in a second mode to return said severing cup and said cavity therein to said initial position thereof and reinverting such cup in preparation for preforming another gob into an elongate mold charge and for delivering such other mold charge to the forming cavity of a forming mold.

5. Apparatus in accordance with claim 4 and in which said first and second motor means comprise first and second pressurized fluid cylinders and associated piston rods, respectively.

6. Apparatus in accordance with claim 5 and in which said shaft is a spline shaft and said second motor means is connected with such spline shaft by a rack having teeth meshing with the teeth of the shaft.

7. Apparatus in accordance with claim 5 and in which said first and second pressurized fluid cylinders are hydraulic and pneumatic cylinders, respectively.

8. Apparatus in accordance with claim 6 and in which said first and second pressurized fluid cylinders are hydraulic and pneumatic cylinders, respectively.

* * * * *

UNITED STATES PATENT OFFICE
CERTIFICATE OF CORRECTION

PATENT NO. : 4,002,451
DATED : January 11, 1977
INVENTOR(S) : Warren R. Knapp and Richard L. West, Sr.

It is certified that error appears in the above-identified patent and that said Letters Patent are hereby corrected as shown below:

Column 1, line 22, "glass mold without" should read --glass mold charges without--; Column 1, line 29, "characteristics" should read --characteristic--; Column 1, line 47, "view of a part" should read --view of part--; Column 1, line 53, "illustrates" should read --illustrate--; Column 3, line 30, "times" should read --time--; Column 3, line 36, "CY1," should read --CY1 is,--; Column 4, lines 45 and 46 "ernergization" should read --energization--; Column 6, line 18, "form" should read --from--; Column 6, line 40, "of each of such" should read --of each such--; Column 6, line 58, "issues such orifice" should read --issues from such orifice--; Column 7, line 1, "severing" should read --serving--; Column 7, line 3, before "rapidly" insert --(C)--; Column 7, line 6, "such mold facing" should read --such mold charge facing--.

Signed and Sealed this

Twenty-sixth Day of April 1977

[SEAL]

Attest:

RUTH C. MASON
Attesting Officer

C. MARSHALL DANN
Commissioner of Patents and Trademarks